United States Patent
Larson (10) Patent No.: US 8,046,552 B2
(45) Date of Patent: Oct. 25, 2011

(54) TRACKING METADATA CHANGES DURING DATA COPY IN A STORAGE SYSTEM

(75) Inventor: Susan L. Larson, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 12/242,087

(22) Filed: Sep. 30, 2008

(65) Prior Publication Data

US 2010/0082920 A1   Apr. 1, 2010

Related U.S. Application Data (60) Provisional application No. 61/024,560, filed on Jan. 30, 2008.

(51) Int. Cl.
*G06F 12/16* (2006.01)

(52) U.S. Cl. ........ 711/162; 711/111; 711/156; 711/161; 711/165; 707/640

(58) Field of Classification Search ............... None
See application file for complete search history.

(56) References Cited

U.S. PATENT DOCUMENTS

| | | |
|---|---|---|
| RE37,601 E | 3/2002 | Eastridge et al. |
| 6,385,626 B1 | 5/2002 | Tamer et al. |
| 6,460,054 B1 | 10/2002 | Grummon |
| 6,516,327 B1 | 2/2003 | Zondervan et al. |
| 6,549,921 B1 | 4/2003 | Ofek |
| 6,993,530 B2 | 1/2006 | Lee et al. |
| 7,103,796 B1 | 9/2006 | Kekre et al. |
| 7,133,985 B1 | 11/2006 | Haase et al. |
| 7,165,155 B1 | 1/2007 | Duprey et al. |
| 7,225,307 B2 | 5/2007 | Micka et al. |
| 7,320,100 B2 * | 1/2008 | Dixon et al. .................. 714/758 |
| 7,395,378 B1 * | 7/2008 | Pendharkar et al. .......... 711/144 |
| 2003/0177325 A1 | 9/2003 | Jann et al. |
| 2003/0182322 A1 * | 9/2003 | Manley et al. ................ 707/201 |
| 2005/0091283 A1 * | 4/2005 | Debique et al. ............. 707/104.1 |
| 2005/0177692 A1 | 8/2005 | Boyd et al. |
| 2007/0300025 A1 * | 12/2007 | Korlepara ..................... 711/162 |

* cited by examiner

*Primary Examiner* — John Lane (57) ABSTRACT

Embodiments include methods, apparatus, and systems for tracking metadata changes during copying in a storage system. One embodiment includes a method that uses a bitmap and two fences to track changes to metadata while a copy of the metadata is being transferred from a source disk array to a destination disk array.

20 Claims, 5 Drawing Sheets

TRACKING METADATA CHANGES DURING DATA COPY IN A STORAGE SYSTEM

CROSS REFERENCE TO RELATED APPLICATIONS

This Application claims the benefit of U.S. Provisional Application Ser. No. 61/024,560, filed Jan. 30, 2008, titled "Tracking Metadata Changes During Data Copy In A Storage System" which is hereby incorporated by reference herein as if reproduced in full below.

BACKGROUND

In some storage systems, data in a logical disk residing on a virtual disk array is stored and retrieved from physical disks within a disk array. Mapping information referred to as "metadata" is used to locate the stored data. This metadata can be kept in the disk array controller memory and/or on physical disks within the disk array.

When a logical disk is transferred from one disk array to another disk array, this metadata must also be copied so that the destination disk array can locate the stored data. During the transfer of a logical disk, it is preferable to allow continued host access to the stored data in that logical disk on the source array. However, continued access to the logical disk can cause changes in the source metadata. Problems arise if the source metadata is changed while this metadata is being copied since the destination disk array would not have an accurate copy of the metadata.

In order to guarantee that the metadata is identical on the source and destination disk arrays, some storage systems lock access to the data during an entire time that all of the metadata is being copied. During this time, host computers are denied access to the data during the copy. This process is effective in preventing changes to metadata being copied, but causes problems in applications running on the host computer. Commands can timeout and applications can appear to hang.

DETAILED DESCRIPTION

Exemplary embodiments are directed to methods, systems, and apparatus for tracking changes to data when ownership or control of the data is transferred from one storage device (such as a controller or disk array) to another storage device (such as another controller or disk array). Transfer of the data occurs without interrupting host access to logical disks associated with the data. When a logical disk is transferred from one storage location to another storage location, the mapping information (i.e., the metadata used to locate the stored data) is copied from the source disk array to a destination disk array. During the transfer of the logical disk, hosts and applications have continuous access to the stored data in the logical disk on the source array.

In order to guarantee that the metadata is identical on the source and destination arrays, exemplary embodiments use starting and ending fences and a bitmap to track changes to the metadata that occur while the transfer is in progress. This structure insures that changes in the source metadata also occur in the destination metadata. Further, the size of the bitmap is scaled to the size of available memory of the source storage device and limited by an amount of data being copied at one time from the source storage device to the destination storage device.

Figure 1:
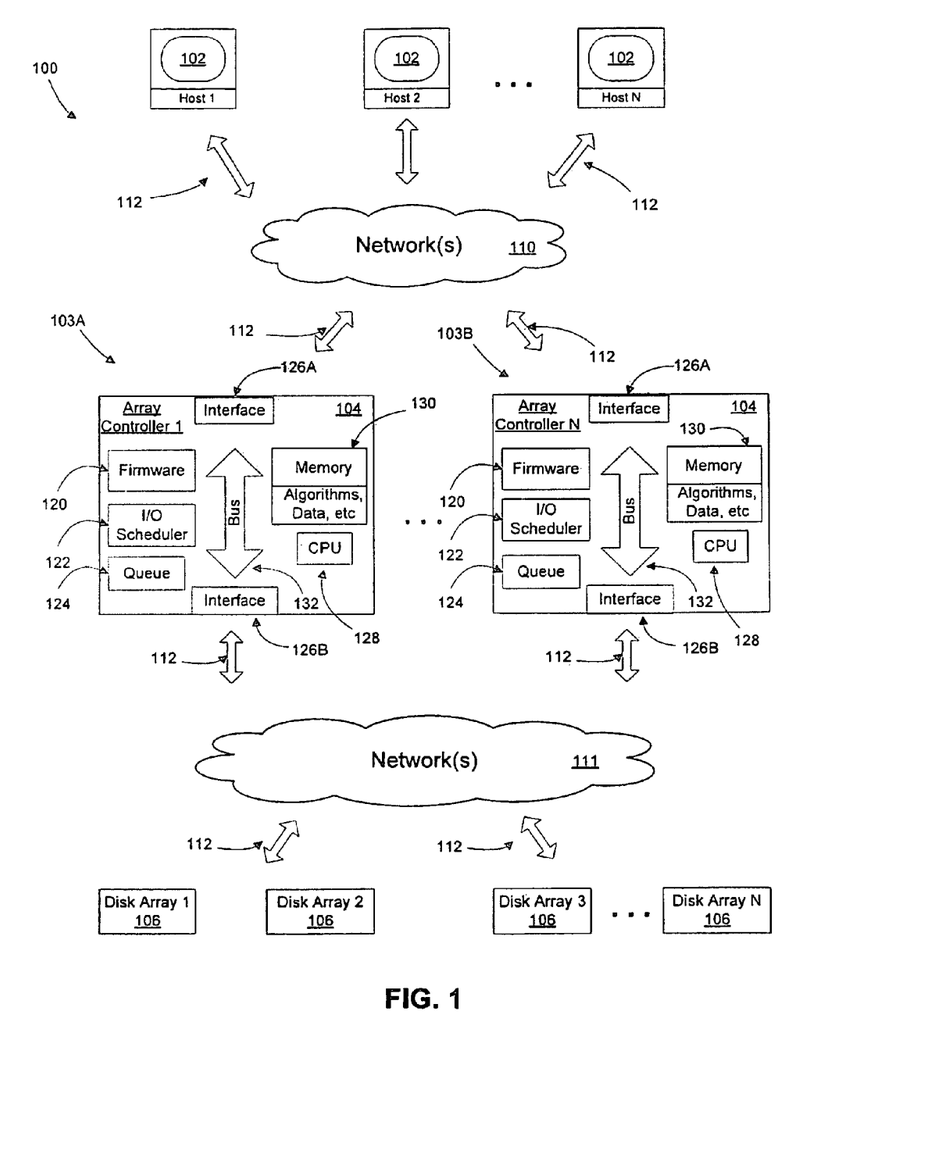
FIG. 1 is a block diagram of a storage system in accordance with an exemplary embodiment.

FIG. 1 is a block diagram of an exemplary distributed file or storage system 100 in accordance with an exemplary embodiment of the invention. By way of example, the system is a storage network and/or a storage area network (SAN) that includes a plurality of host computers 102 and one or more storage devices or arrays 103A, 103B that include one or more storage controllers 104 (shown by way of example as an array controller), and a plurality of storage devices 106 (shown by way of example as disk array 1 to disk array N).

The host computers 102 (shown as host 1 to host N) are coupled to the array controllers 104 through one or more fabrics or networks 110, and the storage devices or arrays 103 are coupled to the storage devices 106 through one or more fabrics or networks 111. For instance, the hosts communicate with an array controller using a small computer system interface (SCSI) or other interface/commands over a fiber channel (FC). By way of example, networks 110 and 111 include one or more of the Ethernet, fibre channel (FC), serial attached SCSI (SAS), iSCSI, internet, local area network (LAN), wide area network (WAN), public and/or private networks, etc. Communications links 112 are shown in the figure to represent communication paths or couplings between the hosts, controllers, and storage devices.

In one exemplary embodiment, the array controller 104 and disk arrays 106 are network attached devices providing random access memory (RAM) and/or disk space (for storage and as virtual RAM) and/or some other form of storage such as magnetic memory (example, tapes), micromechanical systems (MEMS), or optical disks, to name a few examples. Typically, the array controller and disk arrays include larger amounts of RAM and/or disk space and one or more specialized devices, such as network disk drives or disk drive arrays, (example, redundant array of independent disks (RAID)), high speed tape, magnetic random access memory (MRAM) systems or other devices, and combinations thereof. In one exemplary embodiment, the array controller 104 and disk arrays 106 are memory nodes that include one or more servers.

The storage controller 104 manages various data storage and retrieval operations. Storage controller 104 receives I/O requests or commands from the host computers 102, such as data read requests, data write requests, maintenance requests, etc. Storage controller 104 handles the storage and retrieval of data on the multiple disk arrays 106 and disk groups. In one exemplary embodiment, storage controller 104 is a separate device or may be part of a computer system, such as a server. Additionally, the storage controller 104 may be located with, proximate, or a great geographical distance from the disk arrays 106 or from each other.

The array controller 104 includes numerous electronic devices, circuit boards, electronic components, etc. By way of example, the array controller 104 includes firmware 120, an input/output (I/O) scheduler 122, a buffer or queue 124 (for example, used to temporarily store the metadata structures during ownership transfer), one or more interfaces 126, one or more processors 128 (shown by way of example as a CPU, central processing unit), and memory 130 (including read and write cache). CPU 128 performs operations and tasks necessary to manage the various data storage and data retrieval requests received from host computers 102. For instance, processor 128 is coupled to a host interface 126A that provides bidirectional data/communications to one or more host computers 102. Processor 128 is also coupled to an array interface 126B that provides bidirectional data communications to the disk arrays 106.

Memory 130 is also coupled to processor 128 and stores various information used by processor when carrying out its tasks. By way of example, memory 130 includes one or more of volatile memory, non-volatile memory, or a combination of volatile and non-volatile memory. The memory 130, for example, stores applications, data, control programs, algorithms (including software to implement or assist in implementing embodiments in accordance with the present invention), and other data associated with the storage device (example, state data such as mapping metadata, configuration metadata, and cached user data). The processor 128 communicates with memory 130, interfaces 126, and the other components via one or more buses 132.

In at least one embodiment, the storage devices are fault tolerant by using existing replication, disk logging, and disk imaging systems and other methods including, but not limited to, one or more levels of redundant array of inexpensive disks (RAID). Replication provides high availability when one or more of the disk arrays crash or otherwise fail. Further, in one exemplary embodiment, the storage devices provide memory in the form of a disk or array of disks where data items to be addressed are accessed as individual blocks stored in disks (example, 512, 1024, 4096, etc . . . bytes each) or stripe fragments (4K, 16K, 32K, etc . . . each).

In one exemplary embodiment, the I/O scheduler manages and schedules processor time for performing I/O requests. The scheduler balances loads and prevents any one process from monopolizing resources while other processes starve for such resources. The scheduler further performs such functions as deciding which jobs (example, I/O requests) are to be admitted to a ready queue, deciding a number or amount of processes to concurrently execute, determining how performance (example, bandwidth or I/Os per second) is divided among plural initiators (example, applications) so each initiator receives optimal performance.

In one embodiment the storage devices 103A, 103B are disk arrays. Each disk array can have one or more controllers. For instance, an array has two controllers for redundancy. Further, the storage devices include both production disks and backup disks as discussed herein.

In one embodiment, storage devices 103A, 103B are physically located in a same data center. In another embodiment, the storage devices are located a great geographical distance apart in separate data centers. Further, although only two storage devices are shown, a SAN can include hundreds or thousands of such storage devices.

Figure 2:
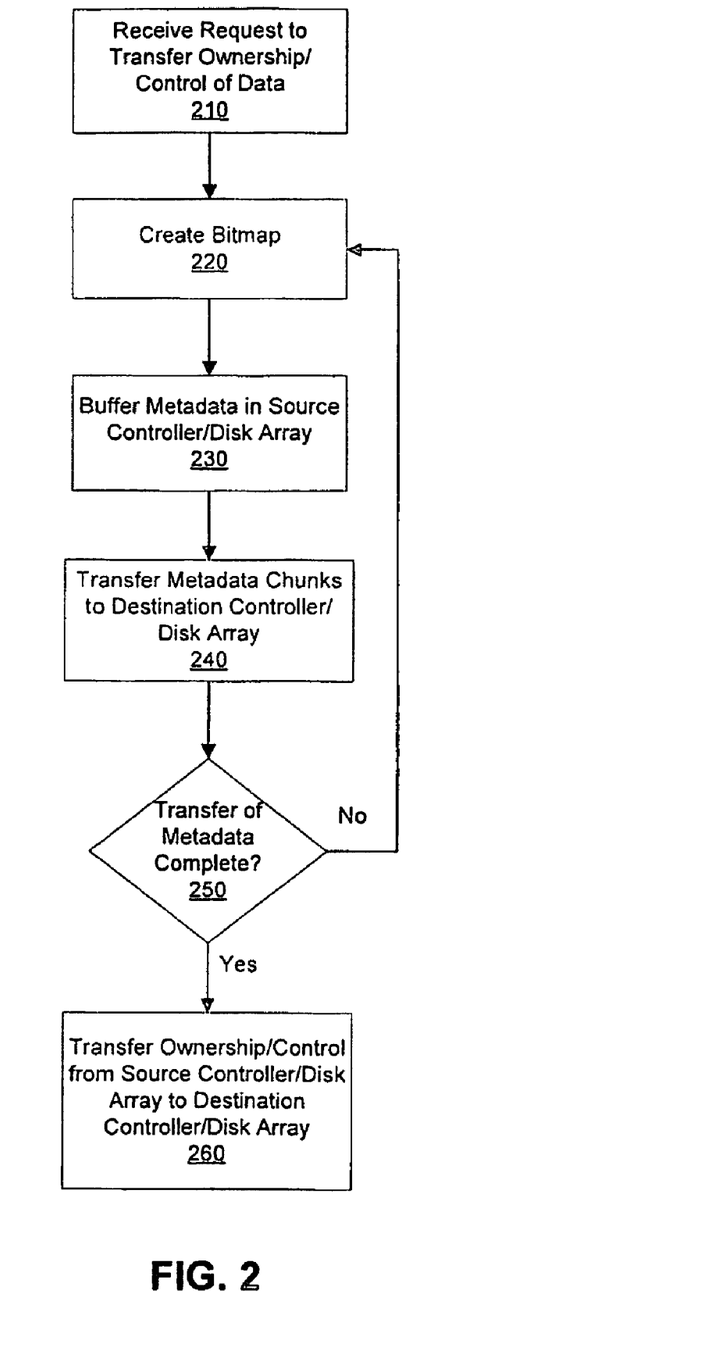
FIG. 2 is a flow diagram for transferring ownership from a source disk array to a destination disk array in accordance with an exemplary embodiment.

FIG. 2 is a flow diagram for transferring ownership, management, or control from a source storage device to a destination storage device. For illustration purposes, the source and destination storage devices are controllers and/or disk arrays.

According to block 210, the source disk array receives a request or command to transfer ownership or control of data from a source controller or disk array to a destination controller or disk array.

In one exemplary embodiment, the data in a logical disk residing on a virtual disk is stored and retrieved from a storage device, such as a physical disk. Metadata is used to locate and manage the stored data on the physical storage devices. For example, when a logical disk is transferred from one disk array to another disk array, the source disk array controlling the data transfers ownership to the destination disk array. During this transfer, the metadata associated with the logical disk is transferred from the source disk array to the destination disk array. The actual data residing in the physical disks is not moved. Instead, only the metadata associated with this data is moved or transferred. The metadata is transferred so the destination disk array can locate and manage the data on the physical storage devices.

According to block 220, a bitmap is created. In one embodiment, the bitmap is created by the source controller or disk array and is used to track changes to the metadata while a copy of the metadata is being transferred from the source disk array to the destination disk array. The size of the bitmap is scaled to the size of the available memory or memory actually being used in the source controller or disk array for the transfer. The bitmap can also be sized to allow several bitmaps to reside in memory simultaneously so several data copy operations occur in parallel. In one embodiment, a size of the bitmap is limited by the amount of data to be copied at one time. This size of the bitmap is thus based on, proportional to, or calculated from the size of the memory being used to transfer the metadata.

According to block 230, the metadata is copied to a buffer or other memory in the source controller or disk array. Chunks of metadata or metadata structures are then transferred from the source controller or disk array to the destination controller or disk array according to block 240.

In one embodiment, the number of bits in the bitmap is an even multiple of the number of metadata structures that can fit into a system data buffer. For example, if a system data buffer can hold 256 metadata structures, tracking changes to the metadata structures while they are buffered requires a 256 bit map or 32 bytes of memory. Thus, the size of the bitmap is an even multiple of 32 bytes depending on the number of system data buffers to be used for each copy operation.

Once the metadata temporarily stored in the buffer of the source controller or disk array is transferred, a determination is made as to whether more metadata needs to be transferred according to block 250. If the answer to this question is "yes" then more metadata associated with the data exists, and flow loops back to block 220. If the answer to this question is "no" then no more metadata associated with the data exists. Flow then proceeds to block 260. Here, the source controller or disk array transfers ownership and/or control of the data to the destination controller or disk array.

During the transfer of metadata, data to be copied is bounded with a start fence containing the starting address of the currently buffered data and an end fence containing the ending address of the currently buffered data. If changes are made to the original data between the start and end fences while the copy is in progress, the bit in the bitmap corresponding to the offset of the changed data from the start fence is set. After the copy of the data between the fences completes, the data corresponding to set bits in the bitmap is copied again.

Exemplary embodiments enable the simultaneous transfer of large groups of logical disks from one disk array to another disk array. The metadata associated with these logical disks is transferred without consuming or requiring large amounts of memory in the source controller. Disk array controllers typically have limited memory. Also, logical disk sizes are steadily increasing with each generation of disk arrays. The amount of memory in the bitmap required to track changes in the metadata for a group of disks is relatively small and will not exceed the amount of memory available in the disk array controller (for example, the size of a memory buffer allocated for storing chunks of metadata during the transfer).

One embodiment uses a bitmap and two fences to track changes in only the area of metadata currently being copied. The size of the area being copied is selected so that a bitmap to track changes will not over burden the available memory resources.

In one embodiment, the size of the bitmap is flexible and based on the size of the metadata currently being copied and not based on the size of the entire metadata data mapping. By way of illustration, assume that a single metadata structure tracks eight megabytes of disk space and that a single bit in the bitmap corresponds to one metadata structure. Also assume that a logical disk of two terabytes (2 TB) in size is being transferred from one disk array to another. With exemplary embodiments, a size of the bitmap is adjusted to the number of metadata structures currently being copied in a buffer of the controller. If a controller data buffer holds two hundred and fifty six (256) metadata structures, then the size of the bitmap is set at two hundred and fifty six (256) bits. So, the size of the bitmap corresponds with a buffer memory size being used to transfer chunks of metadata from one disk array to another disk array. The size of the bitmap is not required to be large enough to accommodate the entire metadata mapping structure. In other words, a bitmap of 32K would be needed to track changes to the entire metadata structure for a logical disk of up to the 2 TB in size. Exemplary embodiments, however, can track this 2 TB transfer by using a much smaller bitmap (for example, a 256 bit bitmap assuming the controller simultaneously buffers 256 metadata structures).

Figure 3A:
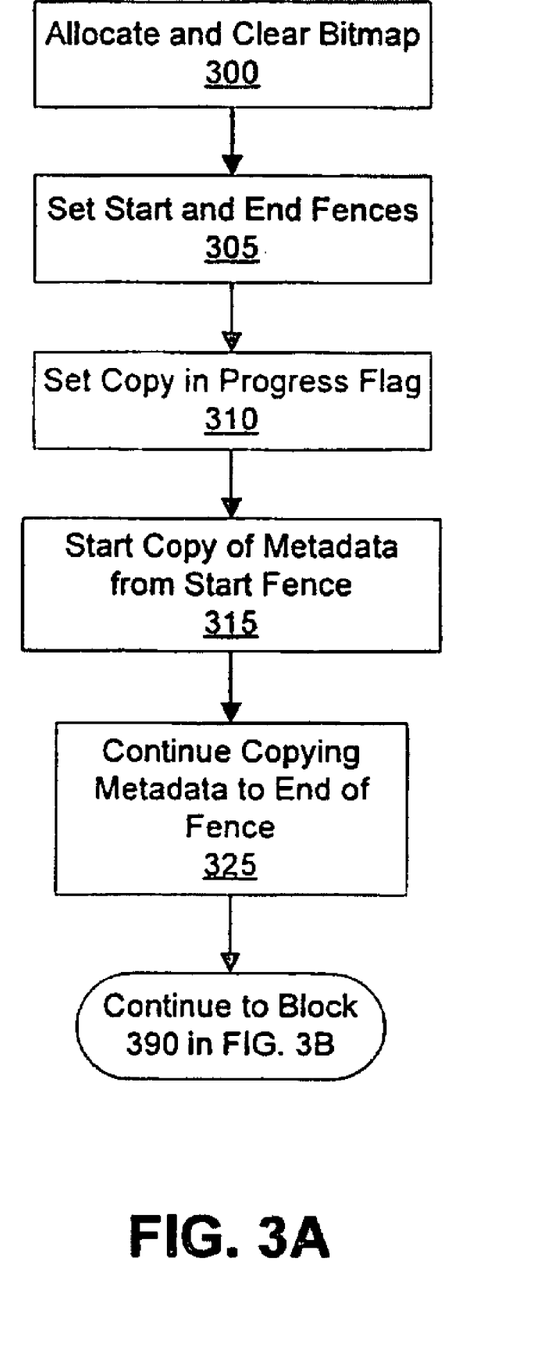
FIG. 3A is a flow diagram for using a bitmap and two fences to manage metadata changes during an ownership transfer in accordance with an exemplary embodiment.
Figure 3B:
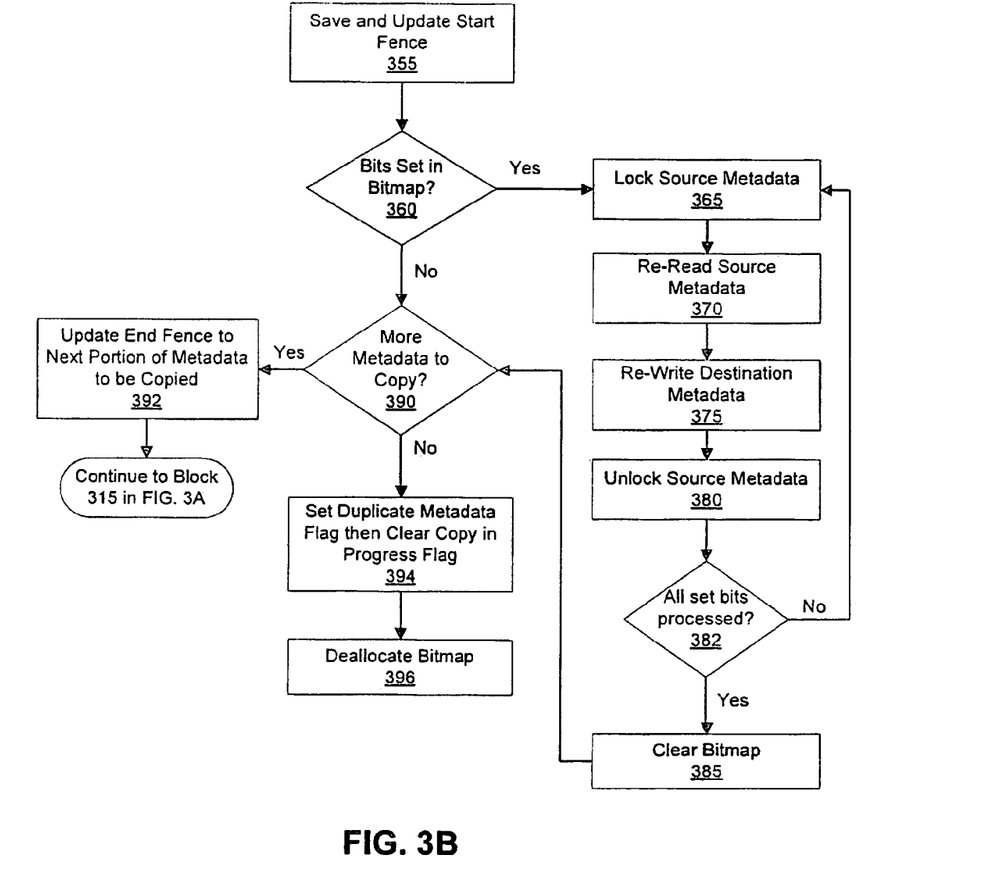
FIG. 3B is a continuation of FIG. 3A using a bitmap and two fences to manage metadata changes during an ownership transfer in accordance with an exemplary embodiment.
Figure 3C:
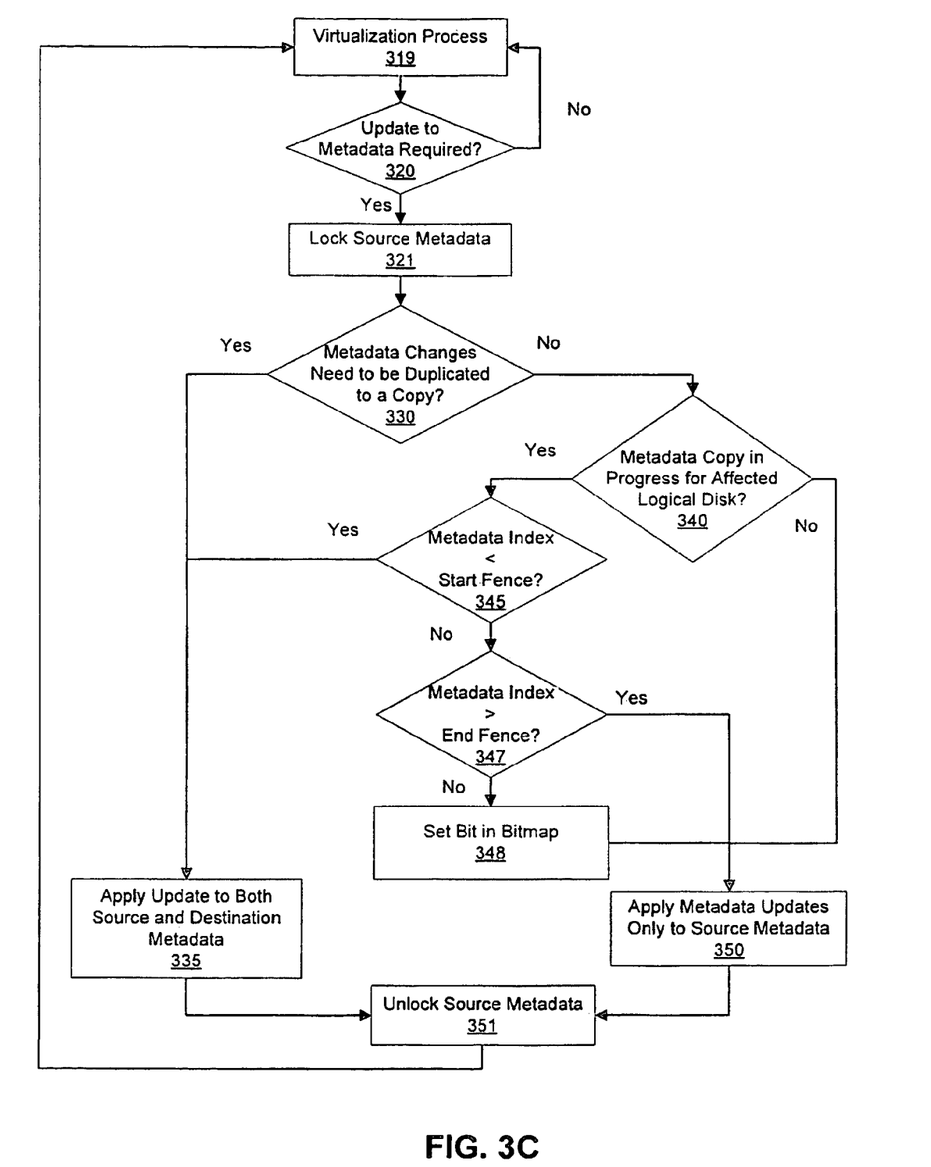
FIG. 3C is a continuation of FIG. 3A using a bitmap and two fences to manage metadata changes during an ownership transfer in accordance with an exemplary embodiment.

FIGS. 3A to 3C are flow diagrams for using a bitmap and multiple fences to manage metadata changes during an ownership transfer in accordance with an exemplary embodiment.

According to block 300, the bitmap is allocated and cleared. Then the start and end fences are set according to block 305. In one embodiment, the start fence is set to the starting index of the beginning of the portion of currently buffered metadata to be copied, and the end fence is set to the index of the end of the portion of currently buffered metadata to be copied.

According to block 310, appropriate flags are set. In one embodiment, a "copy in progress" flag is set for the affected logical disk. The "copy in progress" flag and a "duplicate metadata" flag are cleared by default when the logical disk is created.

According to block 315, metadata is copied from the start fence through the end fence in block 325. Flow then continues to block 390 in FIG. 3B.

A virtualization process also separately executes in parallel with the copying of metadata. This virtualization process commences at block 319 in FIG. 3C. According to block 320, a question is asked whether an update to metadata is required. If the answer to this question is "no" then flow returns to block 319. If the answer to this question is "yes" then flow proceeds to block 321 where the source metadata is locked. Flow then proceeds to block 330 where a determination is made as to whether metadata changes need to be duplicated to a copy. If the answer to this question is "yes" then flow proceeds to block 335 where updates are applied to both the source and destination metadata. Flow then continues to block 351 where the source metadata is unlocked.

During normal ongoing array operations (block 319), if a metadata update is required a check or verification is made to determine if metadata changes should be duplicated to a copy by checking the "duplicate metadata" flag for the affected logical disk. If the "duplicate metadata" flag is set, then updates are applied to both the source and destination metadata.

If the answer to the question in block 330 is "no" then flow proceeds to block 340 where a determination is made as to whether a metadata copy is in progress for the affected logical disk. If the metadata copy is in progress, then flow proceeds to block 345 and updates are applied. In other words, if the "duplicate metadata" flag is not set, check the "copy in progress" flag to see if a metadata copy is in progress for the affected logical disk. If a metadata copy is in progress, then apply updates. In one exemplary embodiment, these updates include:

a. If the index for the metadata to be updated is less than the start fence (block 345), apply the metadata updates to both the copy source and destination metadata (block 335).

b. If the index for the metadata is greater than the end fence (block 347), make changes to the source metadata only (block 350). The updated source metadata will be copied to the destination metadata when the copy progresses to that index.

c. If the index for the metadata is greater than or equal to the start fence and less than or equal to the end fence, make changes to the source metadata (block 350) and set a bit in the bitmap corresponding to the metadata index offset from the start fence (block 348).

If the answer to the question in block 340 is "no" then flow proceeds to block 350, and metadata updates are only applied to the source metadata. In other words, if neither flag is set, apply the metadata updates only to the source metadata. Flow then proceeds to block 351 where the source metadata is unlocked.

According to block 355, the start fence is saved an updated. In one embodiment, after the copy started in block 315 completes, save the start fence off and then update the active start fence to the end fence+1. One embodiment updates the start fence at this point so that the bitmap does not change while it is being processed. Also, updates to this portion of the metadata can now be safely made to both the source and destination metadata at and below the end fence.

According to block 360, a determination is made as to whether a bit in the bitmap is set. If the answer to this question is "yes" then flow proceeds to block 365 and the metadata corresponding to the set bit is locked. The source metadata is then re-read according to block 370, and the destination metadata is re-written according to block 375. Once the metadata is written, the source metadata is unlocked according to block 380. According to block 382, a question is asked whether all set bits are processed. If the answer to this question is "no" then flow proceeds back to block 365. If the answer to this question is "yes" then flow proceeds to block 385 and the bitmap is cleared. Flow then proceeds to block 390.

By way of example, the bitmap is checked for set bits that indicate metadata changes during processing. Use the saved off start fence and the offset to the set bit from the beginning of the bitmap to find the metadata index of the updated metadata. Any metadata structures with a bit set in the bitmap are read again from the source copy and rewritten to the destination copy. The individual metadata structure in the source can be locked to guard against changes to the source metadata during this second copy to the destination. If so, the source metadata structure is unlocked as soon as the second copy completes.

If the answer to the question in block 360 is "no" then flow proceeds to block 390 where a determination is made as to whether more metadata needs to be copied. If the answer to this question is "yes" then flow proceeds to block 392. Here, the end fence is updated to the ending index of the next portion of metadata to be copied. Flow then continues back to block 315 in FIG. 3A.

If the answer to the question in block 390 is "no" then flow proceeds to block 394 where the flags are set and cleared. By way of example, after all of the metadata has been copied, set the "duplicate metadata" flag for the affected logical disk then clear the "copy in progress" flag. Finally, according to block 396, deallocate the bitmap.

Exemplary embodiments are easily portable to hardware platforms with varying amounts of memory and different system data buffer sizes. Exemplary methods can be used without modification for logical disks of any size. This will result in a development cost savings in an evolving product line. Allowing continuous access to data in logical disks while they are being transferred from one disk array to another will also result in greater customer satisfaction. Furthermore, tracking changes using the bit map allows bulk processing of the metadata structures during the copy operation without the need to lock the source metadata structures. The bulk copy makes the overall operation faster and more efficient than the prior single fence solution by amortizing the messaging overhead across the entire batch of metadata structures.

As used herein, the term "storage device" means any data storage device capable of storing data including, but not limited to, one or more of a disk array, a disk drive, a tape drive, optical drive, a SCSI device, or a fiber channel device. As used herein, a "disk array" or "array" is a storage system that includes plural disk drive, a cache, and controller. Arrays include, but are not limited to, networked attached storage (NAS) arrays, modular SAN arrays, monolithic SAN arrays, utility SAN arrays, and storage virtualization.

As used herein, a "virtual disk" is a virtual logical disk or volume to which a host or application performs input/output (I/O) operations. By way of example, vdisks are used in Fibre channel and SAN infrastructures. Disks are virtual due to the method by which they are mapped to the physical storage capacity. In some virtual storage systems, a meta-data mapping table translates an incoming (virtual) disk identifier and LBA (logical block addressing) to a physical disk identifier and LBA. The virtualization granularity depends on the implementation. Some virtualized systems provide disk aggregation and so the granularity is a physical disk itself. Other virtualization systems actually break down the physical disks into smaller chunks or extents. These latter systems spread a single virtual disk across many physical disks, obtain more concurrent access than a non-virtualized system, and provide a performance benefit.

As used herein, "metadata" is information or data about data. Metadata is data that describes characteristics of other data stored on a storage device and includes information that aids in identifying, discovering, assessing, and/or managing the other stored data.

As used herein, a "bitmap" is a data structure (such as an array data structure) that stores individual bits (Boolean values) as an array. For example, in a bitmap that stores kw bits, w is the number of bits in the unit of storage (such as a byte or word) and k is an integer.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
using a bitmap and two fences to track changes to metadata while a copy of the metadata is being transferred from a source disk array to a destination disk array.

2. The method of claim 1 further comprising:
setting a start fence to mark a beginning of a portion of the metadata;
setting an end fence to mark an end of the portion of the metadata.

3. The method of claim 1 further comprising, limiting a size of the bitmap to a portion of the metadata that is buffered in the source disk array.

4. The method of claim 1 further comprising, setting a bit in the bitmap when changes are made to the metadata between a start fence and end fence while a portion of the copy of the metadata is being transferred.

5. The method of claim 1 further comprising, using the bitmap and the two fences to track changes in only an area of metadata currently being copied from the source disk array to the destination disk array.

6. The method of claim 1 further comprising, generating the bitmap to have a number of bits that is an even multiple of a number of metadata structures that fit into a data buffer of the source disk array.

7. The method of claim 1 further comprising:
detecting when a portion of the metadata is altered while a copy of the portion of the metadata is being transferred;
locking access to the portion of the metadata during a subsequent copy of the portion of the metadata after detecting the portion of the metadata was altered.

8. A tangible computer readable storage medium having instructions for causing a computer to execute a method, comprising:
generating a bitmap to have a size that is based on a size of available memory in a source storage device; and
using the bitmap to track changes to metadata while a copy of the metadata is being transferred from the source storage device to a destination storage device.

9. The tangible computer readable storage medium of claim 8 further comprising, limiting the size of the bitmap to a portion of the metadata being copied at one time from the source storage device to the destination storage device.

10. The tangible computer readable storage medium of claim 8 further comprising:
determining when a bit in the bitmap changes while a portion of the copy of the metadata between a start fence and an end fence is being transferred;
recopying, from the source storage device to the destination storage device, metadata corresponding to the bit.

11. The tangible computer readable storage medium of claim 8 further comprising:
determining a size of a buffer in the storage device that temporarily holds the metadata being transferred from the source storage device to the destination storage device;
generating the size of the bitmap based on the size of the buffer.

12. The tangible computer readable storage medium of claim 8, wherein the metadata to be copied is bound with a start fence that contains a starting address of the metadata and an end fence that contains an ending address of the metadata.

13. The tangible computer readable storage medium of claim 8 further comprising, applying metadata updates to both a copy source and a destination source when an index for the metadata is less than a start fence.

14. The tangible computer readable storage medium of claim 8 further comprising, applying metadata updates to only a source of the metadata when an index for the metadata is greater than an end fence.

15. The tangible computer readable storage medium of claim 8 further comprising, when an index for the metadata is greater than or equal to a start fence and less than or equal to an end fence, making changes to a source metadata and setting a bit in the bitmap corresponding to a metadata index offset from the start fence.

16. The tangible computer readable storage medium of claim 8 further comprising, using start and end fences to track changes to a portion of the metadata while a copy of the portion of the metadata is being transferred.

17. A disk array, comprising:
a memory for storing metadata to be transferred; and
a controller for generating a bitmap to have a size that is based on a size of the metadata stored in the memory and for using the bitmap to determine when changes occur to the metadata while the metadata is being transferred from the disk array to another disk array.

18. The method of claim 17, wherein the controller further sets a start fence to mark a beginning of the metadata and sets an end fence to mark an end of the metadata.

19. The method of claim 17, wherein the controller further sets a bit in the bitmap when changes are made to the metadata between a start fence and end fence while the metadata is being transferred.

20. The method of claim 17, wherein the size of the bitmap is flexible to accommodate different amounts of metadata being stored in the memory.

* * * * *